United States Patent
Bang et al.

(10) Patent No.: US 11,313,234 B2
(45) Date of Patent: Apr. 26, 2022

(54) BLADE FOR GAS TURBINE

(71) Applicant: KOREA INSTITUTE OF MACHINERY & MATERIALS, Daejeon (KR)

(72) Inventors: Je Sung Bang, Daejeon (KR); Jung Ho Lee, Daejeon (KR); Hyung Soo Lim, Daejeon (KR); Jeong Min Seo, Daejeon (KR); Do Won Kang, Daejeon (KR); Jin Sub Kim, Daejeon (KR); Jeong Lak Sohn, Daejeon (KR); Junsik Lee, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 16/646,698

(22) PCT Filed: Mar. 28, 2018

(86) PCT No.: PCT/KR2018/003666
§ 371 (c)(1),
(2) Date: Mar. 12, 2020

(87) PCT Pub. No.: WO2019/054590
PCT Pub. Date: Mar. 21, 2019

(65) Prior Publication Data
US 2020/0277859 A1     Sep. 3, 2020

(30) Foreign Application Priority Data

Sep. 12, 2017 (KR) .................... 10-2017-0116377

(51) Int. Cl.
*F01D 5/18* (2006.01)
*F01D 5/14* (2006.01)

(52) U.S. Cl.
CPC ............. *F01D 5/183* (2013.01); *F01D 5/141* (2013.01); *F01D 5/185* (2013.01); *F01D 5/188* (2013.01);
(Continued)

(58) Field of Classification Search
CPC .......... F01D 5/183; F01D 5/184; F01D 5/186; F01D 5/187; F01D 5/188; F05D 2300/514; F05D 2300/611
See application file for complete search history.

(56) References Cited

U.S. PATENT DOCUMENTS 3,240,468 A  *  3/1966  Watts ...................... F01D 5/183
                                                      415/117
3,647,316 A  *  3/1972  Moskowitz ............. F01D 5/183
                                                      416/97 R
(Continued)

FOREIGN PATENT DOCUMENTS

CN         101173610 A        5/2008
EP         1087037 A2         3/2001
(Continued)

OTHER PUBLICATIONS

International Search Report dated Jul. 31, 2018, corresponding to International Application No. PCT/KR2018/003666.
(Continued)

*Primary Examiner* — Christopher R Legendre
(74) *Attorney, Agent, or Firm* — Hauptman Ham, LLP

(57) ABSTRACT

A blade for a gas turbine includes an external structure including a plurality of seating grooves which are separately disposed in a chord direction toward a trailing edge from a leading edge, an internal structure received in the external structure and including a plurality of protrusions protruding toward an internal side of the external structure, a plurality of porous strips combined to the seating groove in an
(Continued)

attachable/detachable way, and a coolant channel formed for a coolant to flow among the porous strip, the neighboring protrusions, and an external side of the internal structure.

16 Claims, 11 Drawing Sheets

(52) U.S. Cl.
CPC .. *F05D 2240/303* (2013.01); *F05D 2240/304* (2013.01); *F05D 2300/514* (2013.01); *F05D 2300/611* (2013.01)

(56) References Cited

U.S. PATENT DOCUMENTS

| | | | | |
|---|---|---|---|---|
| 6,007,296 | A * | 12/1999 | Ernst | F01D 25/32 411/349 |
| 7,144,220 | B2 * | 12/2006 | Marcin, Jr. | C04B 37/005 416/97 A |
| 7,857,587 | B2 * | 12/2010 | Correia | F01D 5/20 416/92 |
| 9,856,739 | B2 * | 1/2018 | Bedrosyan | F01D 5/20 |
| 10,458,259 | B2 * | 10/2019 | Allen | F01D 9/041 |
| 2005/0031450 | A1 | 2/2005 | Cunha et al. | |
| 2011/0189015 | A1 * | 8/2011 | Shepherd | F01D 5/288 416/95 |
| 2015/0064019 | A1 * | 3/2015 | Lacy | F01D 5/186 416/97 A |
| 2015/0322795 | A1 * | 11/2015 | Thomas | F01D 5/284 427/8 |
| 2015/0345302 | A1 * | 12/2015 | Birnkrant | C04B 35/10 416/97 A |
| 2016/0101561 | A1 | 4/2016 | Walston et al. | |
| 2018/0051568 | A1 * | 2/2018 | Bunker | F23R 3/002 |
| 2018/0111200 | A1 * | 4/2018 | Bunker | F01D 5/28 |
| 2020/0277859 | A1 * | 9/2020 | Bang | F01D 5/185 |

FOREIGN PATENT DOCUMENTS

| | | |
|---|---|---|
| JP | 54-102412 A | 8/1979 |
| JP | 2006-43771 A | 2/2006 |
| JP | 2006-83851 A | 3/2006 |
| KR | 20060030114 A | 4/2006 |
| KR | 10-1617705 B1 | 5/2016 |

OTHER PUBLICATIONS

Written opinion issued Jul. 31, 2018, corresponding to PCT/KR2018/003666.

Korean Office Action dated Jul. 28, 2020 for corresponding Korean patent application No. 10-2017-01163// with English Machine Translation.

* cited by examiner

BLADE FOR GAS TURBINE

CROSS-REFERENCE TO RELATED APPLICATION

The present application is a national stage filing under 35 U.S.C § 371 of PCT application number PCT/KR2018/003666 filed on Mar. 28, 2018 which is based upon and claims the benefit of priorities to Korean Patent Application No. 10-2017-0116377, filed on Sep. 12, 2017 in the Korean Intellectual Property Office, which are incorporated herein in their entireties by reference.

BACKGROUND OF THE INVENTION

(a) Field of the Invention

The present invention relates to a blade for a gas turbine. More particularly, the present invention relates to a blade for a gas turbine for forming a cooling layer by discharging a coolant to an external side of a blade contacting a combustion gas through a porous material.

(b) Description of the Related Art

A gas turbine is a rotation-type internal combustion engine for acquiring a torque by expanding a high-temperature and high-pressure combustion gas and rotating a turbine, and it is configured to include a compressor for compressing air inflowing from the atmosphere, a combustor for mixing the compressed air with fuel and combusting them, and a turbine rotated by an expansion force of the combustion gas discharged from the combustor. The gas turbine has advantages of allowing a simpler configuration and greater horse power than a reciprocating internal combustion engine or a steam turbine, and it is used in power plants, locomotives, ships, and airplanes. The gas turbine is also referred to as a jet engine.

Efficiency of the gas turbine becomes better as a compression ratio with air and a temperature of the combustion gas increase. Recently, heat-resistance coating technology and cooling technology for the blade have been further developed so that the temperature of the combustion gas is raised to reach about 1700° C., thereby maximizing performance of the gas turbine.

As the temperature of the combustion gas increases, heat resistance of the gas turbine becomes an issue, and particularly, the blade is one of parts that are weak against heat from among the parts of the gas turbine exposed to the high-temperature combustion gas. Various methods for cooling the blade have been developed so as to increase the heat resistance of the blade. The blade cooling methods in current use are generally divided into internal convection cooling, impingement cooling, film cooling, and transpiration cooling.

The convection cooling represents a method for allowing cooling air to pass through a plurality of air paths formed inside the blade and cooling the air by convection of hot air and cold air, and it is used in initial gas turbine models.

The impingement cooling is one type of convection cooling, and it represents a method of installing a small cylindrical tube in a leading edge of the blade, allowing the cooling air output from a hole formed in the tube to collide with the leading edge of the blade, thereby absorbing heat.

The film cooling represents a cooling method of allowing cooling air to be discharged through a hole or a slit obliquely formed in a surface of the blade so that the cooling air may form a thin air film on the surface of the blade and prevent direct contact of a high-temperature gas.

The transpiration cooling represents a cooling method of forming a thin air film on the surface of the blade by manufacturing a wall material of the blade with a porous material and discharging the cooling air.

FIG. 1 shows an example of a blade for a gas turbine proposed by a conventional transpiration cooling scheme.

Referring to FIG. 1, the blade 1 for a gas turbine proposed by a conventional transpiration cooling method includes a blade body 2 for forming a cooling channel 6 inside an air foil shape and configured of a porous material, and a porous heat blocking layer 4 formed on an external side of the blade body 2, and it is integrally formed by electroplating the porous heat blocking layer 4 on the external side of the blade body 2 manufactured by a casting method in a multi-layered structure.

When the blade is damaged by various causes such as blade deformation due to contact with a combustion gas, an internal crack due to thermal stress, or pore clogging due to corrosion and deposition, it must be replaced. However, the blade 1 for a gas turbine according to a conventional transpiration cooling type must be integrally formed through casting and plating, so the entire blade must be replaced when it is damaged, and the cost and effort for maintaining the blade are high.

Further, a crack is generated in the blade by the thermal stress generated by a temperature difference between the inside and the outside of the blade, and the blade is broken when the crack is progressed.

In addition, a bending stress and a distorting stress are generated to the blade contacting the combustion gas, and the integrally manufactured blade is deformed to absorb them, so the blade is deformed or damaged by fatigue. Particularly, the external side of the blade on which a maximum shearing force is generated is the most vulnerable to fatigue.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a blade for a gas turbine for reducing a cost and effort for maintenance on the blade and preventing cracks and damage caused by thermal stress and fatigue by configuring a porous strip through which a coolant is discharged to be separately replaced.

The present invention has been made in an effort to provide a blade for a gas turbine including: an external structure including a plurality of seating grooves which are separately disposed in a chord direction provided toward a trailing edge from a leading edge, the external structure having an air foil shape of which an inside is empty; an internal structure including a plurality of protrusions protruding toward an internal side of the external structure, closely attached to the internal side of the external structure, and separately disposed in the chord direction, the internal structure received in the external structure; a plurality of porous strips combined to the seating groove in an attachable/detachable way, and separately disposed on the external structure in the chord direction; and a coolant channel formed for a coolant to flow among the porous strip, the neighboring protrusions, and an external side of the internal structure, wherein a region in which the porous strip is disposed in the chord direction and a region in which the porous strip is not disposed are alternately disposed on the external side of the external structure, and the coolant supplied to the coolant channel is discharged to an outside through the porous strip, while a cooling layer is formed on the external side of the external structure.

The seating groove may be formed to be narrower as the direction goes to an external side of the external structure from an internal side thereof, and the porous strip may be formed to correspond to a shape of the seating groove so that it may be inserted into the seating groove.

The protrusion may be disposed to concurrently support a lateral side of the porous strip and a lateral side of the seating groove.

A coefficient of thermal expansion of the porous strip may be formed to be greater than a coefficient of thermal expansion of the external structure, so the porous strip may expand and may be closely attached into the seating groove by heat of an external combustion gas.

The seating groove may be formed to have a single linear shape in a span direction crossing the chord direction.

The seating groove may be formed to have a plurality of linear shapes divided in a span direction crossing the chord direction.

The internal structure may further include a plurality of combustion gas channels separately formed in the chord direction inside the internal structure and in which a combustion gas input from an outside flows, and the external combustion gas may flow in the combustion gas channel, so a temperature gradient and a pressure difference between the external structure and the internal structure may reduce.

The blade for a gas turbine may further include a cover member combined to a tip portion of the external structure and the internal structure, and a through-hole for communicating with the combustion gas channel so that external combustion gas may be input to the combustion gas channel.

A heat shield coating layer for blocking heat of the combustion gas flowing in the combustion gas channel may be formed on an internal side of the combustion gas channel.

The blade for a gas turbine may further include a porous coating layer formed in a porous strip combined to the seating groove and having less thermal conductivity than thermal conductivity of the porous strip.

A sum of a thickness of the porous strip and a thickness of the porous coating layer may correspond to a depth of the seating groove.

Porosity of the porous coating layer may be lower than porosity of the porous strip.

Porosity of the porous strip may reduce in a direction going to an external side that is near an outside where the combustion gas flows from an internal side that is near the internal structure, and porosity of the porous coating layer may reduce in a direction going to the external side provided near the outside where the combustion gas flows from the internal side provided near the porous strip.

Porosity of the porous strip or the porous coating layer disposed on the leading edge may be greater than porosity of the porous strip or the porous coating layer disposed on a mid-chord between the leading edge and the trailing edge.

A distance between the neighboring porous strips disposed on the leading edge may be less than a distance between the neighboring porous strips disposed on a mid-chord between the leading edge and the trailing edge.

A width of a seating groove formed in the leading edge may be greater than a width of a seating groove formed in a mid-chord between the leading edge and the trailing edge.

The blade for a gas turbine according to an exemplary embodiment of the present invention may replace the porous strip, thereby substantially reducing the cost and effort for maintaining the blade.

The blade for a gas turbine according to an exemplary embodiment of the present invention may simultaneously acquire excellence of cooling efficiency of the transpiration cooling and rigidity and durability of the blade.

The blade for a gas turbine according to an exemplary embodiment of the present invention may replace one of the external structure and the internal structure, thereby substantially reducing the cost and effort for maintenance of the blade.

The blade for a gas turbine according to an exemplary embodiment of the present invention may absorb the shearing force generated to the blade and may extend the lifespan of the blade.

The blade for a gas turbine according to an exemplary embodiment of the present invention may uniformly cool the entire side of the blade.

The blade for a gas turbine according to an exemplary embodiment of the present invention may allow the porous strip to be firmly combined to the seating groove.

The blade for a gas turbine according to an exemplary embodiment of the present invention may minimize the fatigue damage of the blade caused by the thermal stress and the compression force, and may accordingly extend the lifespan of the blade.

The blade for a gas turbine according to an exemplary embodiment of the present invention may further firmly attach the internal structure and the external structure by the inner pressure formed inside the blade.

The blade for a gas turbine according to an exemplary embodiment of the present invention may prevent the internal structure from being deformed, corroded, or worn by the heat of combustion gas through the heat shield coating layer.

The blade for a gas turbine according to an exemplary embodiment of the present invention may increase the heat shield effect on the external flowage at the high temperature.

The blade for a gas turbine according to an exemplary embodiment of the present invention may reduce the risk for the external side of the porous coating layer or the external side of the porous strip to be clogged by foreign materials.

The blade for a gas turbine according to an exemplary embodiment of the present invention may perform efficient cooling according to the difference of thermal loads and may effectively use the flow of the limited coolant.

DETAILED DESCRIPTION OF THE EMBODIMENTS

Figure 1:
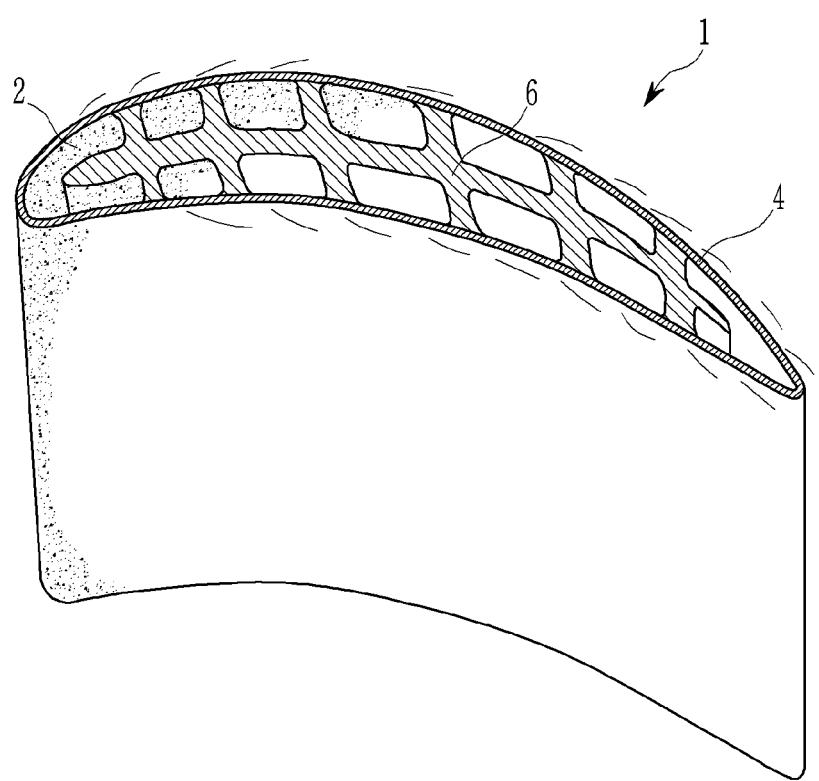
FIG. 1 shows an example of a blade for a gas turbine proposed by a conventional transpiration cooling scheme.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Throughout this specification and the claims that follow, when it is described that an element is "coupled" to another element, the element may be "directly coupled" to the other element or "indirectly coupled" to the other element through a third element. Unless explicitly described to the contrary, the word "comprise" and variations such as "comprises" or "comprising" will be understood to imply the inclusion of stated elements but not the exclusion of any other elements.

Figure 2:
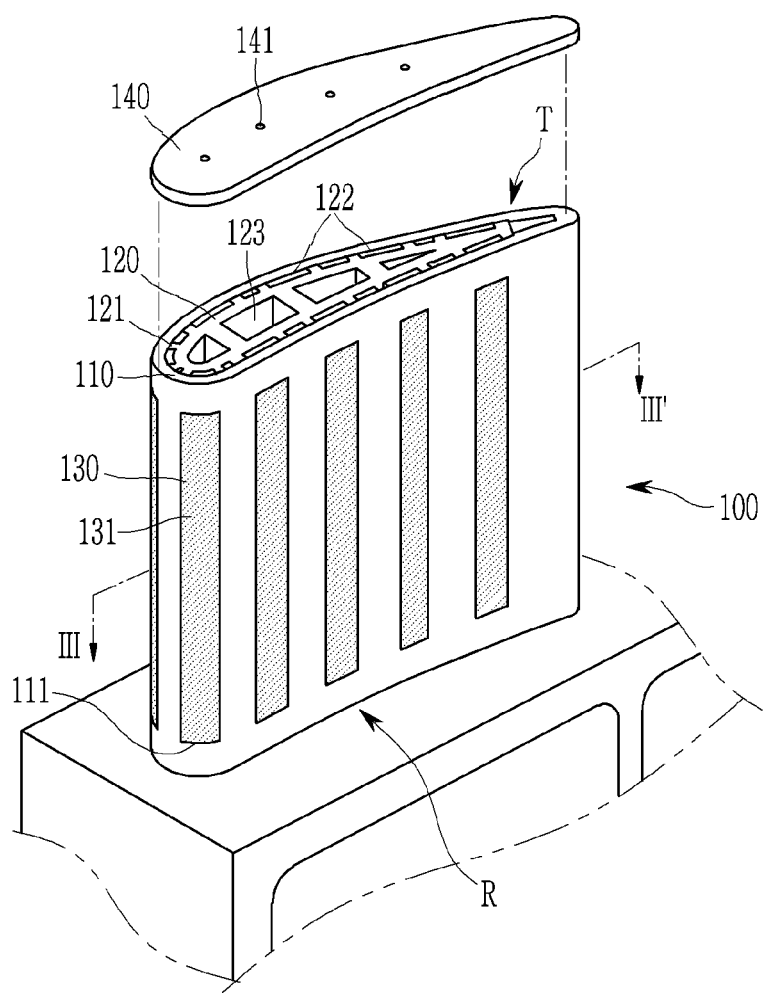
FIG. 2 shows an exploded perspective view of a blade for a gas turbine according to an exemplary embodiment of the present invention.
Figure 3:
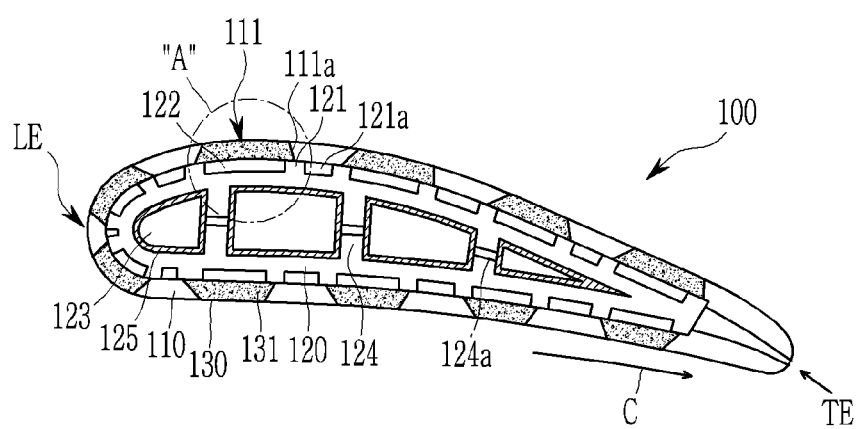
FIG. 3 shows a longitudinal sectional view of a blade for a gas turbine of FIG. 2 with respect to a line III-III'.
Figure 4:
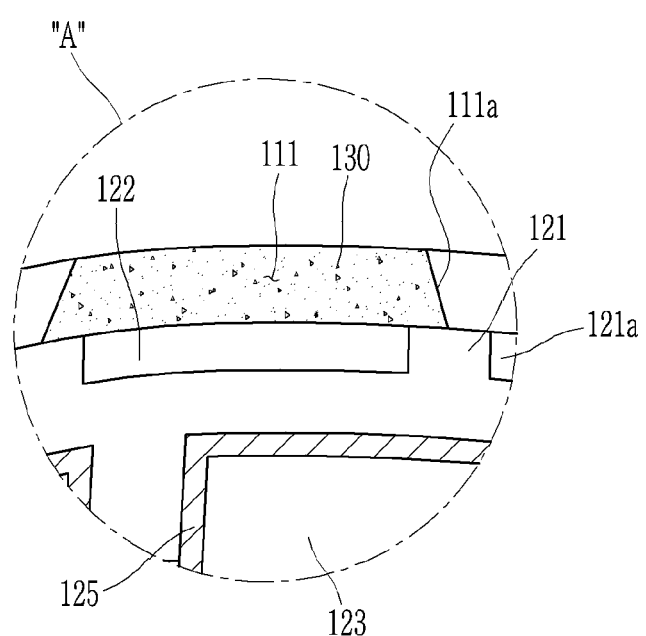
FIG. 4 shows a partial enlarged view of a portion "A" of a blade for a gas turbine of FIG. 3.
Figure 5:
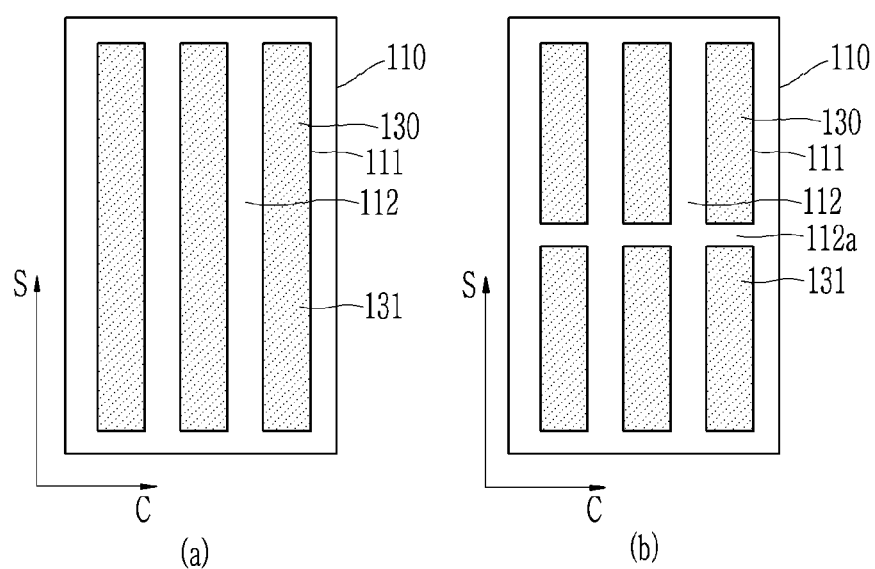
FIG. 5 shows a porous strip of a blade for a gas turbine according to another exemplary embodiment of the present invention.
Figure 6:
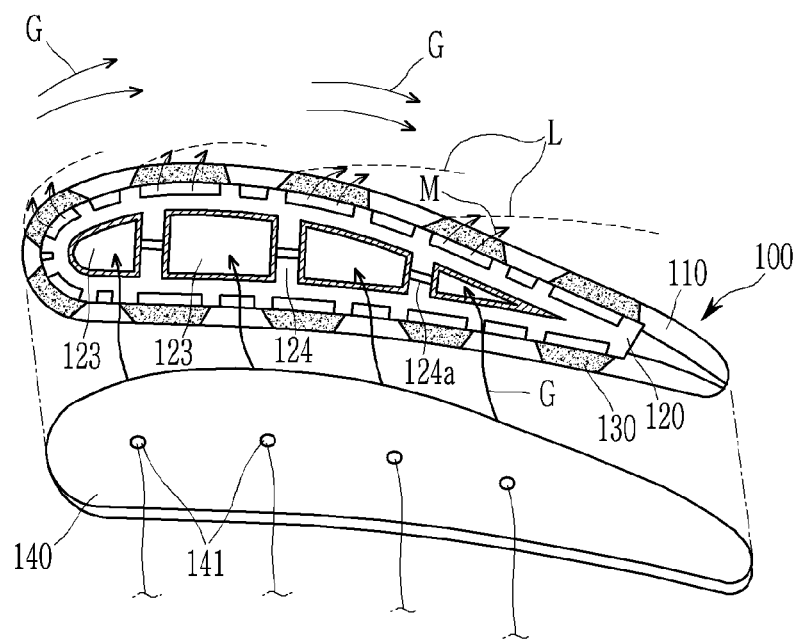
FIG. 6 shows a schematic view of a process for cooling a blade for a gas turbine according to an exemplary embodiment of the present invention.

FIG. 1 shows an example of a blade for a gas turbine proposed by a conventional transpiration cooling scheme, FIG. 2 shows an exploded perspective view of a blade for a gas turbine according to an exemplary embodiment of the present invention, FIG. 3 shows a longitudinal sectional view of a blade for a gas turbine of FIG. 2 with respect to a line III-III', FIG. 4 shows a partial enlarged view of a portion "A" of a blade for a gas turbine of FIG. 3, FIG. 5 shows a porous strip of a blade for a gas turbine according to another exemplary embodiment of the present invention, and FIG. 6 shows a schematic view of a process for cooling a blade for a gas turbine according to an exemplary embodiment of the present invention.

Referring to FIG. 2 to FIG. 6, the blade for a gas turbine according to an exemplary embodiment of the present invention discharges a coolant (M, specifically, cooling air) to an external side of a blade 100 contacting the combustion gas (G) to form a cooling layer (L), it may separately replace a porous strip 130 through which the coolant (M) is discharged, and it includes an external structure 110, an internal structure 120, and a porous strip 130.

The external structure 110, as shown in FIG. 3, is formed to have an air foil shape of which an inside is empty, and includes a plurality of seating grooves 111 disposed to be separated from each other in a chord direction (C) toward a trailing edge (TE) from a leading edge (LE).

The external structure 110 generates a torque by contacting a high-temperature combustion gas (G), and it may be manufactured with various heat-resisting metal alloys such as a nickel alloy, an aluminum alloy, or a titanium alloy.

A porous strip 130 to be described is combined to the seating groove 111, and as shown in FIG. 2 and FIG. 5, it is desirable for the seating groove 111 to be formed to have a single line shape in the span direction (S) so that the coolant (M) discharged from the porous strip 130 may be uniformly discharged from a root (R) portion to a tip (T) portion of the blade 100.

Further, a center portion of the seating groove 111 is connected with a connecting member 112a so that bending rigidity of a frame member 112 formed on respective sides of the seating groove 111 may be reinforced, so the seating groove 111 may be formed to be a plurality of lines divided in the span direction (S). For reference, as shown, the seating groove 111 may be visible as a line when it is viewed from one side of the blade 100, and in actuality, the seating groove 111 has a curved line form in the span direction of the blade 100. A horizontal width of the frame member 112 for determining a gap in the chord direction of the porous strip 130 may be adjusted according to cooling effectiveness, that is, a temperature difference between the combustion gas outside the turbine and the cooling air, and accordingly required cooling performance.

The internal structure 120 is, as shown in FIG. 3 and FIG. 4, received inside the external structure 110, and regarding the external side of the internal structure 120, a plurality of protrusions 121 protrude toward the internal side of the external structure 110 and are closely attached to the internal side of the external structure 110, and the protrusions 121 are separately disposed in the chord direction (C) so as to form a coolant channel 122 to be described.

The internal structure 120 may be manufactured with various heat-resistance metal alloys in a like manner of the external structure 110, and a material of which a coefficient of thermal expansion is a little greater than that of the external structure 110 may be applied to the internal structure 120, so they may be firmly combined to each other.

Differing from the blade manufactured as an integrated body, the present invention provides a configuration in which the external structure 110 and the internal structure 120 are assembled, and when one of the external structure 110 and the internal structure 120 exposed to the high temperature and high pressure condition is damaged, the damaged part may be separated and replaced, thereby substantially reducing the effort and cost on the maintenance.

Further, the assembled configuration of the external structure 110 and the internal structure 120 may minimize the fatigue deformation or the fatigue failure of the blade 100. This is because, when the blade 100 is bent or distorted more than a predetermined level by the pressure of the combustion gas (G), the external structure and the internal structure (in detail, contact sides between the external structure and the protrusion) slide with each other to absorb a shearing force generated in the blade 100. Through this, the lifespan of the blade 100, particularly, the lifespan of the external structure 110 provided the farthest from a neutral side of the blade 100, may be increased.

The porous strip 130 is combined to the seating groove 111 formed in the external structure 110 in an attachable/detachable way, and a plurality of porous strips 130 are separately disposed in the external structure 110 in the chord direction (C). The porous strip 130 is manufactured of porous ceramic or a specific porous alloy, and its material is not limited as long as it is a material that is resistant to high heat and oxidization.

As a plurality of the porous strips 130 are separately disposed in the external structure 110, an area in which a porous strip 130 is disposed and an area in which no porous strip is disposed (i.e., the area made of a material of the external structure 110) are alternately disposed in the chord direction (C) on the external side of the external structure 110.

Therefore, the external structure 110 remains between the porous strip 130 and the porous strip 130 and the external structure 110 covers most of the stress, so rigidity and durability of the blade may be improved by the external structure 110.

As the porous strip 130 is combined to the seating groove 111, a coolant channel 122 for allowing the coolant (M) to flow is formed among the porous strip 130, the protrusion 121 neighboring the same, and the external side of the internal structure 120. The coolant channel 122 communicates with a cooling path (not shown) formed on a fixing portion or a rotor portion of the turbine, the coolant (M) supplied by the cooling path passes through the coolant channel 122 and is discharged to the outside through the porous strip 130, and a cooling layer (L) is formed on the external side of the external structure 110.

An attaching and detaching configuration of the porous strip 130 is different from the existing blade for a gas turbine. When the blade is heavily corroded by a corrosion component such as sodium, sulfur, or vanadium in the fuel or when a carbide with the corrosion components as major components is attached to a pore 131 of the porous strip 130 and cooling efficiency is lowered, it is difficult to partly maintain the blade since the existing blade for a gas turbine is configured of a porous material, but the blade for a gas turbine according to the present invention may allow the porous strip 130 to be separated and replaced with a new one. Through this, the maintenance cost on the blade 100 may be substantially reduced compared to the existing case.

Particularly, the attaching and detaching configuration of the porous strip 130 realizes a new cooling method that is a combination of the existing film cooling method and the transpiration cooling method.

The film cooling method has a drawback that the entire surface of the blade is not uniformly cooled because of the limited number of spraying holes, and the transpiration cooling method needs to replace the blade each time the pore 131 is clogged by the carbide of the combustion gas (G) and the cooling efficiency lowers, so there may be frequent maintenance. On the contrary, regarding the blade for a gas turbine according to the present invention, the porous strip 130 is disposed on the blade 100 in the entire span direction (S), so the blade 100 may be uniformly cooled, and when the pore of the porous strip 130 is clogged to reduce the cooling efficiency, the porous strip 130 may be replaced, thereby solving the problem of the existing cooling methods.

In order for the porous strip 130 with the attaching and detaching configuration to not leave the external structure 110 during operation of the gas turbine, as shown in FIG. 4, the seating groove 111 is formed to be narrower as the direction goes toward the external side of the external structure 110 from its internal side, and the porous strip 130 is formed to correspond to the shape of the seating groove 111 so that it may be inserted into the seating groove 111. This purpose is for the porous strip 130 to be blocked by an inclined side 111a of the seating groove 111 and fail to leave for the outside.

Further, it is desirable to allow the porous strip 130 to be expanded by external heat of the combustion gas (G) and be firmly combined in the seating groove 111 by forming the coefficient of thermal expansion of the porous strip 130 to be greater than the coefficient of thermal expansion of the external structure 110. In addition, the protrusions 121 are disposed to be separated from each other to a lateral side of the porous strip 130 and a lateral side of the seating groove 111 so that the porous strip 130 may not leave for the internal side of the seating groove 111, and a concave groove 121a is formed in a center portion of the protrusion 121 so as to reduce the weight of the blade 100 and maximally suppress additional thermal deformation.

To increase the cooling effectiveness of the entire surface of the blade, porosity of the porous strip 130 may be differently applied. For example, higher porosity may be applied to the leading edge (LE) of the blade 100 where the combustion gas (G) is stalled.

In another way, as the outside of the blade 100 is exposed to the combustion gas (G) at the high temperature of 1700° C., and the coolant (M) at a low temperature is supplied inside the blade 100, in detail, the coolant (M) at a relatively low temperature on an exit of a compressor is supplied inside the coolant channel 122, a severe temperature difference (conventionally, 1000° C. to 1100° C.) is generated to the internal and external sides of the blade 100. Because of the temperature difference, a thermal stress by a temperature gradient is generated in the blade 100.

Further, the high pressure of 14 to 15 bar is formed outside the blade 100, but there is no channel for forming a pressure inside the internal structure 120, so a large pressure difference is generated inside and outside the blade 100. Because of the pressure difference and the temperature gradient, the blade 100 receives a strong compression force on the inside.

Because of the thermal stress and the compression force, a fatigue crack is generated in the blade 100, and the blade 100 may be damaged as the crack advances, so as shown in FIG. 6, a plurality of combustion gas channels 123 are formed to be separate from each other in the chord direction (C) inside the internal structure 120 so that the combustion gas (G) provided from the outside may flow in the internal structure 120.

By the high-temperature combustion gas (G) input to the combustion gas channel 123, the temperature difference inside and outside the blade 100 reduces, and an internal pressure that is equivalent to the outside is formed inside the blade 100. Accordingly, the temperature and the pressure difference inside and outside the blade 100 reduce to thus reduce the thermal stress and the compression force applied to the blade 100, thereby minimizing the fatigue damage of the blade 100 and increasing the lifespan of the blade 100. Further, the internal structure 120 is further firmly attached to the external structure 110 by the internal pressure.

A cover member 140 is combined to the tip (T, refer to FIG. 2) of the external structure 110 and the internal structure 120 so that the external combustion gas (G) may be input to the combustion gas channel 123. A through-hole 141 communicating with the combustion gas channel 123 is formed in the cover member 140, and a communicating hole 124a may be formed in a channel partition wall 124 so that the pressure between the combustion gas channels 123 may be balanced.

A heat shield coating layer 125 may be formed on the internal side of the combustion gas channel 123 into which a high-temperature combustion gas (G) is provided. This is to prevent the internal structure 120 from being deformed, corroded, and worn by the combustion gas (G), and a heat-resistant and corrosion-resistant material such as glass, alumina, chrome, or a zirconium oxide is melted and sprayed to the internal side of the combustion gas channel 123 to form a heat-resistant film by depositing and accumulating the same, or a heat-resistant alloy mixed with nickel and cobalt is heated and deposited in the vacuum to condense the same on the internal side of the combustion gas channel, thereby forming a heat-resistant film, and various methods and devices known to a person skilled in the art are applicable.

Figure 7:
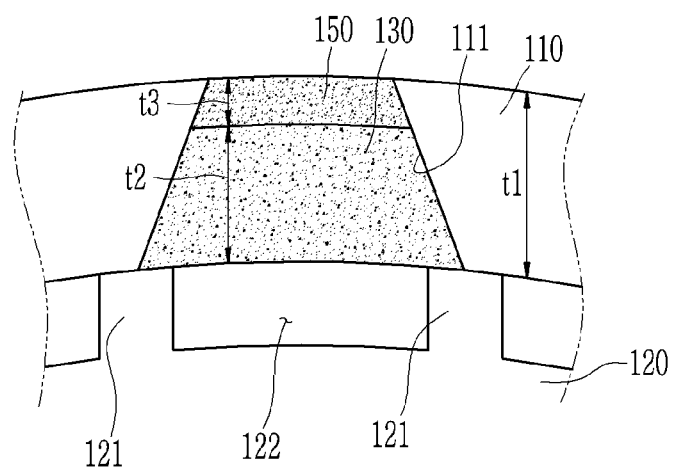
FIG. 7 shows an enlarged porous strip of a blade for a gas turbine and a porous coating layer according to another exemplary embodiment of the present invention.
Figure 8A:
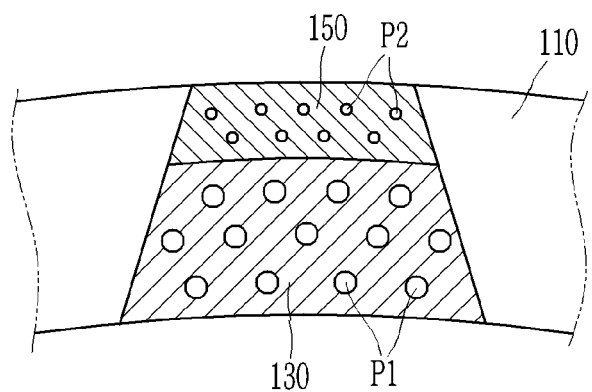
FIGS. 8A and 8B show porosity of a porous strip of a blade for a gas turbine and a porous coating layer of FIG. 7.
Figure 8B:
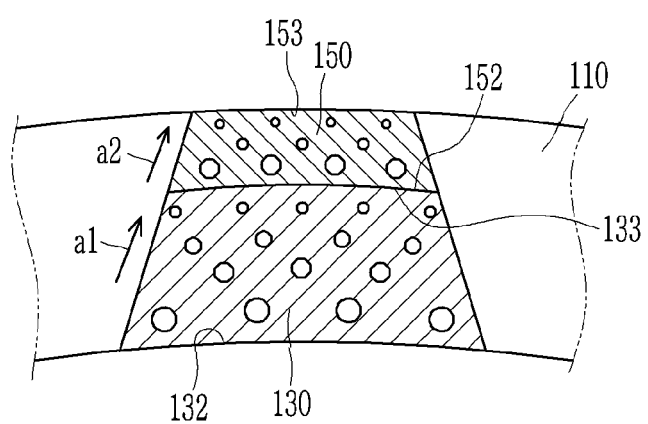

FIG. 7 shows an enlarged porous strip of a blade for a gas turbine and a porous coating layer according to another exemplary embodiment of the present invention, and FIG. 8A and FIG. 8B show shows porosity of a porous strip of a blade for a gas turbine and a porous coating layer of FIG. 7.

Referring to FIG. 7, FIG. 8A and FIG. 8B, the blade for a gas turbine according to the present exemplary embodiment includes an external structure 110, an internal structure 120, a porous strip 130, a cover member 140, and a porous coating layer 150.

The external structure 110, the internal structure 120, the porous strip 130, and the cover member 140 of the blade for a gas turbine according to the present exemplary embodiment substantially correspond to the external structure 110, the internal structure 120, the porous strip 130, and the cover member 140 of the blade for a gas turbine according to an exemplary embodiment described with reference to FIG. 2 to FIG. 6, and no repeated descriptions will be provided.

The porous coating layer 150 is formed in the porous strip 130 combined to the seating groove 111, and it has lower thermal conductivity than the thermal conductivity of the porous strip 130.

As described above, the outside of the blade for a gas turbine is exposed to the combustion gas (G) at the high temperature of 1700° C., and it is preferable to form the porous coating layer 150 with lower thermal conductivity than the thermal conductivity of the porous strip 130 in the porous strip 130 so as to improve a heat shielding effect on the high-temperature combustion gas while performing a transpiration cooling process.

In this instance, the porous strip 130 has porosity but it has to maintain rigidity to a predetermined degree, so it may be manufactured with a porous alloy material for a high-temperature part such as Inconel, and the porous coating layer 150 may be manufactured with a porous ceramic material having lower thermal conductivity than the thermal conductivity of the porous strip 130 so as to obtain the heat shielding effect on the high-temperature external flow.

Referring to FIG. 7, it is desirable for a sum of a thickness t2 of the porous strip 130 and a thickness t3 of the porous coating layer 150 to be substantially equivalent to a depth t1 of the seating groove 111.

When the sum of the thickness t2 of the porous strip 130 and the thickness t3 of the porous coating layer 150 is not equivalent to the depth t1 of the seating groove 111, the seating groove 111 of the external structure 110 may be more concave or convex than the surface of the external structure 110, and the concave or convex configuration may cause a drawback of hindering the flow of the external combustion gas (G).

Referring to FIG. 8A, it is preferable for the porosity of the porous coating layer 150 to be less than the porosity of the porous strip 130.

When components such as a carbide from among the combustion gas (G) flowing to the outside of the external structure 110 are attached to the porous coating layer 150, the porous coating layer 150 may be clogged, and the cooling efficiency of the turbine blade may be deteriorated. Therefore, the risk for the porous coating layer 150 disposed on the external side of the porous strip 130 to be clogged by a foreign material may be reduced by forming the porosity of the porous coating layer 150 to be less than the porosity of the porous strip 130.

For example, as shown in FIG. 8A, when the pore P2 of the porous coating layer 150 may be smaller than the pore P1 of the porous strip 130 so porosity of the porous coating layer 150 may be formed to be less than porosity of the porous strip 130, and in another way, the pore P2 of the porous coating layer 150 has the same size as the pore P1 of the porous strip 130 but pore density of the porous coating layer 150 is low so the porosity of the porous coating layer 150 may be formed to be relatively low.

Referring to FIG. 8B, it is preferable for porosity of the porous strip 130 to become lower in the direction to the external side 133 provided near the outside where the combustion gas (G) flows from the internal side 132 provided near the internal structure 120.

When no porous coating layer 150 is formed on the external side of the porous strip 130, the risk for the external side 133 of the porous strip 130 to be clogged by foreign materials may be reduced by forming the porosity of the external side 133 of the porous strip 130 to be relatively low.

Further, the porosity of the porous coating layer 150 may become lower in the direction to the external side 153 provided near the outside where the combustion gas (G) flows from the internal side 152 provided near the porous strip 130. In a like manner, the risk for the external side 153 of the porous coating layer 150 to be clogged by foreign materials may be reduced by forming porosity of the external side 153 of the exposed porous coating layer 150 to be relatively low.

Figure 9:
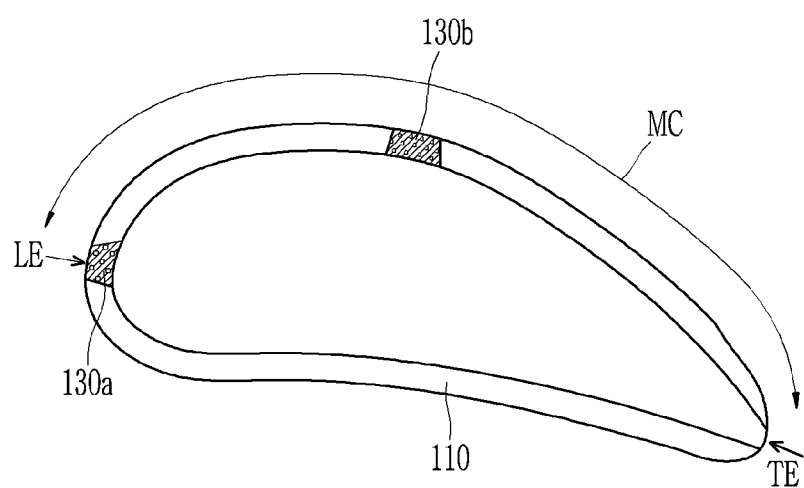
FIG. 9 shows a comparison of porosity of a porous strip disposed on a leading edge and porosity of a porous strip disposed on a mid-chord in a blade for a gas turbine shown in FIG. 2 or FIG. 7.
Figure 10:
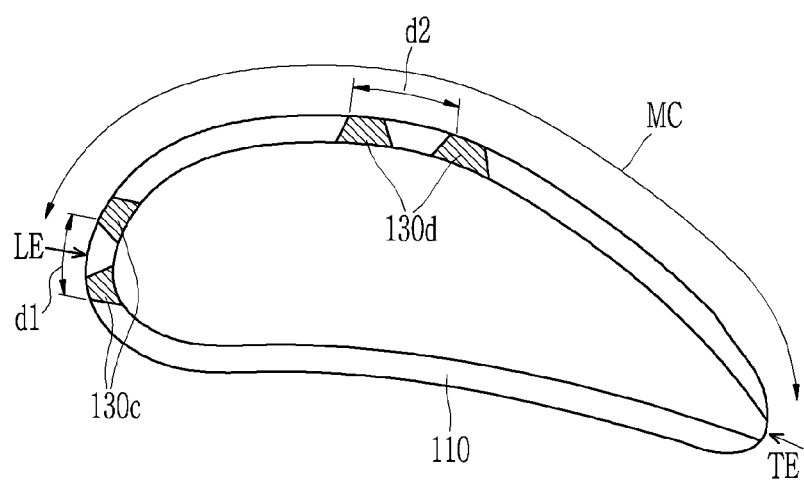
FIG. 10 shows a comparison of a gap between porous strips disposed on a leading edge and a gap between porous strips disposed on a mid-chord in a blade for a gas turbine shown in FIG. 2 or FIG. 7.
Figure 11:
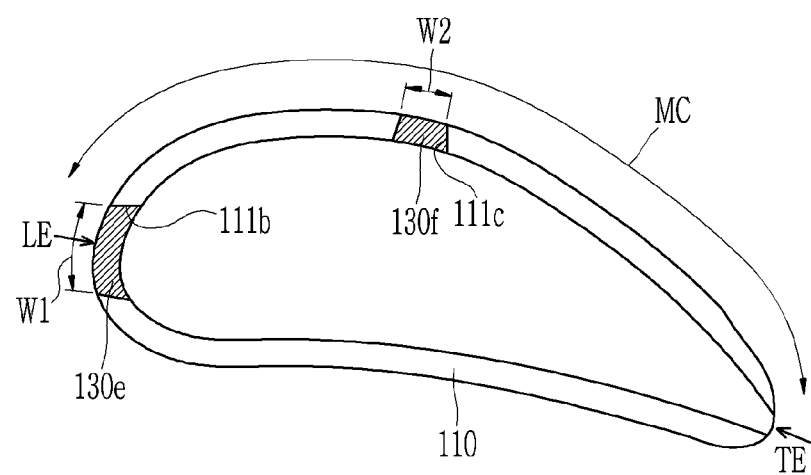
FIG. 11 shows a comparison of a width of a seating groove formed in a leading edge and a width of a seating groove formed in a mid-chord in a blade for a gas turbine shown in FIG. 2 or FIG. 7.

FIG. 9 shows a comparison of porosity of a porous strip disposed on a leading edge and porosity of a porous strip disposed on a mid-chord in a blade for a gas turbine shown in FIG. 2 or FIG. 7, FIG. 10 shows a comparison of a gap between porous strips disposed on a leading edge and a gap between porous strips disposed on a mid-chord in a blade for a gas turbine shown in FIG. 2 or FIG. 7, and FIG. 11 shows a comparison of a width of a seating groove formed in a leading edge and a width of a seating groove formed in a mid-chord in a blade for a gas turbine shown in FIG. 2 or FIG. 7.

Regarding the transpiration cooling case using a porous material, cooling effectiveness increases as the blowing ratio increases, and the flow of the coolant (M) supplied to the blade for a gas turbine is limited, so the porous strip 130 installed in each position must generate optimal cooling effectiveness.

For this purpose, respective blowing ratios may be adjusted by adjusting porosity, disposal methods, and shapes of the porous strip 130 and the porous coating layer 150 for respective positions of a pressure surface and a suction surface of the blade from the leading edge (LE) to the trailing edge (TE).

The leading edge (LE) including a stagnation point represents a region in which the flow of the external combustion gas (G) is slow and the temperature is high, and the mid-chord (MC) between the leading edge (LE) and the trailing edge (TE) represents a region in which the external combustion gas (G) flows fast and its temperature is relatively low.

Therefore, as shown in FIG. 9, porosity of a porous strip 130a or the porous coating layer 150 disposed on the leading edge (LE) may be formed to be greater than porosity of a porous strip 130b or the porous coating layer 150 disposed on the mid-chord (MC) between the leading edge (LE) and the trailing edge (TE).

The leading edge (LE) portion including a stagnation point does not have sufficient cooling effectiveness, so the porous strip 130a or the porous coating layer 150 installed in the leading edge (LE) region may relatively increase the porosity to relatively increase the flow of the coolant (M), and the porous strip 130b or the porous coating layer 150 installed in the mid-chord (MC) may relatively reduce the porosity to relatively decrease the flow of the coolant (M), and hence, efficient cooling is performed according to a difference of heat loads, and the flow of the limited coolant (M) may be efficiently used.

Further, as shown in FIG. 10, a distance d1 between neighboring porous strips 130c disposed on the leading edge (LE) may be formed to be narrower than a distance d2 between neighboring porous strips 130d disposed on the mid-chord (MC).

In a like manner, the leading edge (LE) portion does not have sufficient cooling effectiveness, the disposal distance of the porous strips 130c installed in the leading edge (LE) region is reduced to relatively increase the flow of the coolant (M) sprayed by the porous strip 130c, and the disposal distance of the porous strips 130d installed in the mid-chord (MC) is increased to relatively reduce the flow of the coolant (M) sprayed by the porous strip 130d, so efficient cooling is performed according to the difference of heat loads, and the flow of the limited coolant (M) may be efficiently used.

Further, as shown in FIG. 11, a width w1 of a seating groove 111b formed on the leading edge (LE) may be formed to be greater than a width w2 of a seating groove 111c formed on the mid-chord (MC).

In a like manner, the leading edge (LE) portion does not have sufficient cooling effectiveness, so the width w1 of the seating groove 111b formed in the leading edge (LE) region is increased to relatively increase the flow of the coolant (M) sprayed by a porous strip 130e disposed on the leading edge (LE), and the width w2 of the seating groove 111c formed in the mid-chord (MC) region is reduced to relatively reduce the flow of the coolant (M) sprayed by a porous strip 130f disposed in the mid-chord (MC) region, so efficient cooling is performed according to the difference of heat loads, and the flow of the limited coolant (M) may be efficiently used.

When the porous strip is damaged or the pore is clogged to degrade the cooling efficiency, the blade for a gas turbine configured as described above according to the present invention may separate the porous strip and may replace the same with a new one, thereby obtaining the effect of substantially reducing the cost and effect on the maintenance of the blade.

Further, the porous strip is disposed to be separated from the external structure in the chord direction of the blade, so the blade for a gas turbine configured as described above according to the present invention may acquire the effect of obtaining excellence of the cooling efficiency of the transpiration cooling and rigidity and durability of the blade.

The blade for a gas turbine configured as described above according to the present invention has a configuration in which the external structure and the internal structure are assembled, and when one of them is damaged, the damaged one may be separately replaced, so the cost and effect for maintaining the blade may be substantially reduced.

Regarding the blade for a gas turbine configured as described above according to the present invention, when the blade subjected to resistance of the combustion gas is bent or distorted by more than a predetermined level, the external structure and the internal structure slide with respect to each other to absorb the shearing force generated to the blade, thereby obtaining the effect of increasing the lifespan of the blade.

The blade for a gas turbine configured as described above according to the present invention may obtain the effect of uniformly cooling the entire blade as the porous strip is disposed in the span direction of the blade.

The blade for a gas turbine configured as described above according to the present invention may acquire the effect for the porous strip to be firmly combined to the seating groove by forming the seating groove to become narrower in the direction toward the external side of the external structure from the internal side thereof and forming the coefficient of thermal expansion of the porous strip to be greater than the coefficient of thermal expansion of the external structure.

The blade for a gas turbine configured as described above according to the present invention may minimize the fatigue damage of the blade caused by the thermal stress and the compression force and may increase the lifespan of the blade by inputting the combustion gas to the combustion gas channel and reducing the temperature and pressure difference between the inside and the outside of the blade.

The blade for a gas turbine configured as described above according to the present invention may obtain the effect for the internal structure and the external structure to be firmly attached to each other by inputting the combustion gas to the combustion gas channel and forming an inner pressure inside the blade.

The blade for a gas turbine configured as described above according to the present invention may have the effect of preventing the internal structure from being deformed, corroded, or worn by the heat of the combustion gas through the heat shield coating layer formed inside the combustion gas channel.

The blade for a gas turbine configured as described above according to the present invention may obtain the effect of improving the heat shielding effect on the external flow at the high temperature by forming the porous coating layer with the lower thermal conductivity than the thermal conductivity of the porous strip in the porous strip.

The blade for a gas turbine configured as described above according to the present invention may acquire the effect of reducing the risk for the external side of the porous coating layer or the external side of the porous strip to be clogged by foreign materials by controlling the porosity of the porous coating layer or the porosity of the porous strip.

The blade for a gas turbine configured as described above according to the present invention may perform efficient cooling according to the difference of heat loads and may efficiently use the limited flow of the coolant by adjusting the porosity, the disposal methods, and the shapes of the porous strip or the porous coating layer for respective positions on the surface of the blade.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A blade for a gas turbine, comprising:
an external structure including a plurality of seating grooves which are separately disposed in a chord direction toward a trailing edge from a leading edge, the external structure having an airfoil shape of which an inside is hollow;

an internal structure including a plurality of protrusions protruding toward an internal side of the external structure, closely attached to the internal side of the external structure, and separately disposed in the chord direction, the internal structure received in the external structure;

a plurality of porous strips in the seating grooves, respectively, and separately disposed on the external structure in the chord direction; and a coolant channel formed for a coolant to flow among the porous strips, the protrusions, and an external side of the internal structure, wherein, during operation of the gas turbine, the porous strips are firmly and detachably attached to the external structure by a pressure of the coolant and/or differential thermal expansion of the porous strips relative to the external structure, wherein regions in which the porous strips are disposed and regions in which the porous strips are not disposed are alternately disposed in the chord direction on an external side of the external structure, and the coolant supplied to the coolant channel is discharged to outside the blade through the porous strips, and a cooling layer is formed on the external side of the external structure.

2. The blade for a gas turbine of claim 1, wherein
the seating grooves are formed to be narrower in the direction going to the external side of the external structure from the internal side thereof, and
each porous strip is formed to correspond to a shape of the respective seating groove.

3. The blade for a gas turbine of claim 1, wherein
each protrusion of the plurality of protrusions is disposed to contact a lateral side of a porous strip of the plurality of porous strips and a lateral side of a seating groove of the plurality of seating grooves.

4. The blade for a gas turbine of claim 1, wherein
the differential thermal expansion results from a coefficient of thermal expansion of each porous strip being greater than a coefficient of thermal expansion of the external structure such that each porous strip is configured to expand and firmly attach to the external structure by heat of an external combustion gas.

5. The blade for a gas turbine of claim 1, wherein
each seating groove is formed to have a single linear shape in a span direction crossing the chord direction.

6. The blade for a gas turbine of claim 1, wherein
each seating groove is formed to have a plurality of linear shapes divided in a span direction crossing the chord direction.

7. The blade for a gas turbine of claim 1, wherein
the internal structure further includes a plurality of combustion gas channels separately formed in the chord direction inside the internal structure and in which a combustion gas input from outside the blade flows, thereby reducing a temperature gradient and a pressure difference between the external structure and the internal structure.

8. The blade for a gas turbine of claim 7, further comprising
a cover member combined to a tip portion of the external structure and the internal structure, and including a through-hole for communicating with the combustion gas channels to allow the combustion gas from outside the blade to be input to the combustion gas channels.

9. The blade for a gas turbine of claim 7, wherein
a heat shield coating layer for blocking heat of the combustion gas flowing in the combustion gas channels is formed on an internal side of the combustion gas channels.

10. The blade for a gas turbine of claim 1, further comprising
a porous coating layer formed on a first porous strip of the plurality of porous strips within the respective seating groove and having less thermal conductivity than thermal conductivity of the first porous strip.

11. The blade for a gas turbine of claim 10, wherein
a sum of a thickness of the first porous strip and a thickness of the porous coating layer corresponds to a depth of the respective seating groove.

12. The blade for a gas turbine of claim 10, wherein
a porosity of the porous coating layer is lower than a porosity of the first porous strip.

13. The blade for a gas turbine of claim 10, wherein
a porosity of the first porous strip reduces in a direction going to the external side of the external structure from the internal side of the external structure, and
a porosity of the porous coating layer reduces in a direction going to the external side of the external structure from the internal side of the external structure.

14. The blade for a gas turbine of claim 10, wherein
the first porous strip and the porous coating layer are disposed on the leading edge,
a second porous strip of the plurality of porous strips and a second porous coating layer are within a seating groove of the plurality of seating grooves disposed mid-chord between the leading edge and the trailing edge, and
a porosity of the first porous strip or the porous coating layer is greater than a porosity of the second porous strip or the second porous coating layer.

15. The blade for a gas turbine of claim 1, wherein
a distance between neighboring porous strips of the plurality of porous strips disposed on the leading edge is less than a distance between neighboring porous strips of the plurality of strips disposed mid-chord between the leading edge and the trailing edge.

16. The blade for a gas turbine of claim 1, wherein
a width of a seating groove of the plurality of seating grooves formed in the leading edge is greater than a width of a seating groove of the plurality of seating grooves formed mid-chord between the leading edge and the trailing edge.

* * * * *